US011592214B2

(12) United States Patent
Gupte (10) Patent No.: US 11,592,214 B2
(45) Date of Patent: Feb. 28, 2023

(54) ROW SPLIT COIL SYSTEMS FOR HVAC SYSTEMS

(71) Applicant: Johnson Controls Technology Company, Auburn Hills, MI (US)

(72) Inventor: Neelkanth Gupte, Katy, TX (US)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 290 days.

(21) Appl. No.: 15/958,493

(22) Filed: Apr. 20, 2018

(65) Prior Publication Data

US 2018/0306469 A1 Oct. 25, 2018

Related U.S. Application Data

(60) Provisional application No. 62/487,922, filed on Apr. 20, 2017.

(51) Int. Cl.
| | |
|---|---|
| *F25B 7/00* | (2006.01) |
| *F25B 49/02* | (2006.01) |
| *F25B 39/04* | (2006.01) |
| *F25B 39/02* | (2006.01) |
| *F25B 39/00* | (2006.01) |

(Continued)

(52) U.S. Cl.
CPC ............... *F25B 7/00* (2013.01); *F25B 39/00* (2013.01); *F25B 39/028* (2013.01); *F25B 39/04* (2013.01); *F25B 5/04* (2013.01); *F25B 6/04* (2013.01); *F25B 49/022* (2013.01); *F25B 2339/0444* (2013.01); *F25B 2400/06* (2013.01); *F25B 2500/18* (2013.01); *F25B 2600/0253* (2013.01); *F25B 2700/2116* (2013.01); *F25B 2700/2117* (2013.01)

(58) Field of Classification Search
CPC ...... F25B 7/00; F25B 5/04; F25B 6/04; F25B 2400/06; F25B 5/02; F25B 6/02
See application file for complete search history.

(56) References Cited

U.S. PATENT DOCUMENTS

| | | | |
|---|---|---|---|
| 3,866,439 A | 2/1975 | Bussjager et al. | |
| 4,040,268 A | 8/1977 | Howard | |

(Continued)

FOREIGN PATENT DOCUMENTS

WO 2011005986 A2 1/2011

OTHER PUBLICATIONS

Lennox Product Specifications, Sep. 2017, pp. 1-92, Bulletin No. 210560, Lennox Industries, Inc.

*Primary Examiner* — Lionel Nouketcha
(74) *Attorney, Agent, or Firm* — Fletcher Yoder, P.C.

(57) ABSTRACT

A multiple-circuit heating and cooling system includes a first refrigeration circuit having a first condenser and a first evaporator and a second refrigeration circuit having a second condenser and a second evaporator. The first condenser and the second condenser are arranged in a first row split configuration, and the second condenser is downstream of the first condenser relative to a first air flow directed across the second condenser and the first condenser. Additionally, the first evaporator and the second evaporator are arranged in a second row split configuration, and the first evaporator is downstream of the second evaporator relative to a second air flow directed across the first evaporator and the second evaporator.

26 Claims, 7 Drawing Sheets

(51) Int. Cl.
*F25B 5/04* (2006.01)
*F25B 6/04* (2006.01)

(56) References Cited

U.S. PATENT DOCUMENTS

| | | | | |
|---|---|---|---|---|
| 4,879,881 A * | 11/1989 | Madigan | ................ | F25D 11/02 |
| | | | | 62/447 |
| 5,307,645 A * | 5/1994 | Pannell | .............. | B60H 1/00364 |
| | | | | 454/144 |
| 5,607,011 A * | 3/1997 | Abdelmalek | ........... | F25B 11/04 |
| | | | | 423/220 |
| 6,536,231 B2 * | 3/2003 | Gupte | ...................... | F25B 1/00 |
| | | | | 165/140 |
| 6,553,778 B2 * | 4/2003 | Tipton | .................... | F25B 39/02 |
| | | | | 62/196.1 |
| 6,978,630 B2 * | 12/2005 | Wensink | ............ | B60H 1/00364 |
| | | | | 62/175 |
| 7,032,411 B2 | 4/2006 | Hebert | | |
| 7,908,881 B2 | 3/2011 | Kopko | | |
| 8,047,014 B2 | 11/2011 | Yabu et al. | | |
| 9,109,821 B2 * | 8/2015 | Kim | ......................... | F25B 39/04 |
| 9,791,221 B1 * | 10/2017 | Litch | ......................... | F28F 9/262 |
| 9,980,413 B2 * | 5/2018 | Judge | ................. | H05K 7/20827 |
| 2009/0084120 A1 * | 4/2009 | Meier | ...................... | B64F 1/362 |
| | | | | 62/129 |
| 2010/0107659 A1 * | 5/2010 | Hildreth, Jr. | .............. | F25B 5/02 |
| | | | | 62/77 |
| 2012/0111027 A1 * | 5/2012 | Campbell | ............... | F25B 21/02 |
| | | | | 62/3.3 |
| 2014/0223940 A1 | 8/2014 | Morimoto et al. | | |
| 2014/0224457 A1 | 8/2014 | Suzuki et al. | | |
| 2015/0121940 A1 * | 5/2015 | Lee | ......................... | F25B 39/04 |
| | | | | 62/335 |
| 2015/0121949 A1 * | 5/2015 | Heo | ......................... | F25B 39/04 |
| | | | | 62/510 |
| 2015/0159929 A1 * | 6/2015 | Hancock | ............... | F25B 27/02 |
| | | | | 62/79 |
| 2015/0253018 A1 | 9/2015 | Eguchi et al. | | |
| 2016/0033182 A1 | 2/2016 | Joardar et al. | | |
| 2016/0238325 A1 * | 8/2016 | Johnson | ................ | F25B 39/00 |

* cited by examiner

ROW SPLIT COIL SYSTEMS FOR HVAC SYSTEMS

CROSS REFERENCE TO RELATED APPLICATION

This application claims priority from and the benefit of U.S. Provisional Application Ser. No. 62/487,922, entitled "METHOD OF ARRANGING MULTIPLE REFRIGERATION CIRCUITS," filed Apr. 20, 2017, which is hereby incorporated by reference.

BACKGROUND

This application relates generally to heating, ventilation, and air conditioning (HVAC) systems, and more particularly, to row split coil systems for HVAC systems.

Residential, light commercial, commercial, and industrial systems are used to control temperatures and air quality in buildings. To condition a building, an HVAC system may circulate a refrigerant through a refrigeration circuit between an evaporator where the refrigerant absorbs heat and a condenser where the refrigerant releases heat. The refrigerant flowing within the closed circuit is generally formulated to undergo phase changes within the normal operating temperatures and pressures of the HVAC system so that quantities of heat can be exchanged by virtue of the latent heat of vaporization of the refrigerant to provide conditioned air to the buildings.

In certain instances, the HVAC system may include two or more refrigeration circuits each having an evaporator coil and a condenser coil. In such instances, the evaporator and/or the condenser of the HVAC system may be interlaced, stacked, or otherwise arranged such that a portion of air passing through evaporator coils and/or the condenser coils contacts an active portion of one coil of refrigeration circuit during part-load operation of the HVAC system, while another portion of the air passes through the coils while contacting an inactive portion of another coil. As such, within the evaporator, condensate from the air passing though the active coil may collect on the active coil and flow downward onto a portion of the inactive coil, which may evaporate into the air and increase a humidity of the air provided to a building. Within the condenser, the air passing through the inactive portion of a coil may not transfer heat with the refrigerant within the condenser, thus corresponding to a reduced operating efficiency. Accordingly, improved coil arrangement for the evaporator coils and/or the condenser coils for HVAC systems are desired.

SUMMARY

In one embodiment, a multiple-circuit heating and cooling system includes a first refrigeration circuit having a first condenser and a first evaporator and a second refrigeration circuit having a second condenser and a second evaporator. The first condenser and the second condenser are arranged in a first row split configuration, and the second condenser is downstream of the first condenser relative to a first air flow directed across the second condenser and the first condenser. Additionally, the first evaporator and the second evaporator are arranged in a second row split configuration, and the first evaporator is downstream of the second evaporator relative to a second air flow directed across the first evaporator and the second evaporator.

In another embodiment, a multiple-circuit heating and cooling system includes a first condenser coil of a first refrigeration circuit and a second condenser coil of a second refrigeration circuit. The first condenser coil and the second condenser coil are arranged in a first nested slab, and the second condenser coil is downstream of the first condenser coil relative to a first air flow directed across the first nested slab. The multiple-circuit heating and cooling system also includes a first evaporator coil of the first refrigeration circuit and a second evaporator coil of the second refrigeration circuit. The first evaporator coil and the second evaporator coil are arranged in a second nested slab, and the first evaporator coil is downstream of the second evaporator coil relative to a second air flow directed across the second nested slab.

In another embodiment, a multiple-circuit heating and cooling system includes a row split condenser having a first condenser coil of a first refrigeration circuit and a second condenser coil of a second refrigeration circuit. The second condenser coil is arranged downstream of the first condenser coil relative to a first air flow directed across the row split condenser to enable the first air flow to pass sequentially through the first condenser coil and the second condenser coil in series. The multiple-circuit heating and cooling system also includes a row split evaporator fluidly coupled to the row split condenser. The row split evaporator includes a first evaporator coil of the first refrigeration circuit and a second evaporator coil of the second refrigeration circuit. The first evaporator coil is arranged downstream of the second evaporator coil relative to a second air flow directed across the row split evaporator to enable the second air flow to pass sequentially thorough the second evaporator coil and the first evaporator coil in series.

Other features and advantages of the present application will be apparent from the following, more detailed description of the embodiments, taken in conjunction with the accompanying drawings which illustrate, by way of example, the principles of the application.

DETAILED DESCRIPTION

Embodiments of the present disclosure are directed toward a row split coil system for heating, ventilation, and air conditioning (HVAC) systems that include condensers and/or evaporators having a row split configuration. The row split coil system may generally lower entropy generation for refrigerant flowing within an HVAC system. For example, compared to a traditional stacked or interlaced coil, an evaporator or condenser having the row split configuration may have a lower temperature lift. As discussed herein, temperature lift refers to a temperature difference between a saturated discharge temperature and a saturated suction temperature for a coil. Because temperature lift is representative of a compressor ratio for a compressor of the HVAC system, lowering the temperature lift also reduces the compressor ratio, thereby lowering the compressor power utilized for a same amount of compression work to be performed.

Accordingly, the present row split coil system may lower the temperature lift for each refrigeration circuit having the row split configuration, lower specific compressor work, and accordingly increase a coefficient of performance and an efficiency of the HVAC system having the row split coil system compared to HVAC systems without the row split coil system. The coefficient of performance may generally refer to a ratio of cooling capacity of a refrigeration circuit to an amount of electricity supplied to a compressor of the refrigeration circuit. As discussed in more detail below, the row split coil system may be provided by placing two coils adjacent to one another, such that rows of tubes extending within the coils are generally parallel to one another. The coils may each have a height equal to an overall or complete coil height of the condenser or evaporator in which they are disposed. Therefore, air passing through the row split evaporator or row split condenser contacts an active coil having refrigerant flowing therein, even during part-load operation of the HVAC system.

Figure 1:
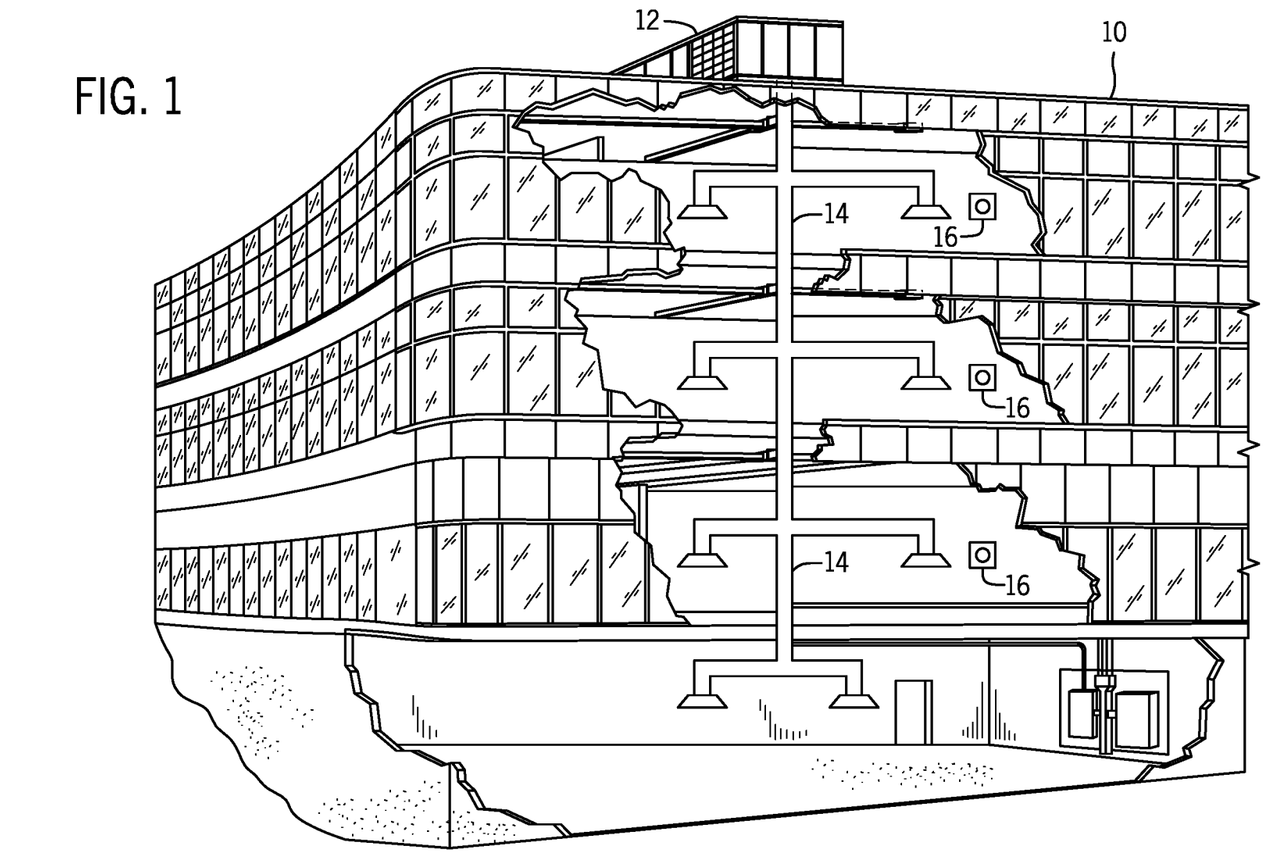
FIG. 1 is an illustration of an embodiment of a commercial or industrial HVAC system, in accordance with the present techniques.

Turning now to the drawings, FIG. 1 illustrates a heating, ventilation, and air conditioning (HVAC) system for building environmental management that may employ one or more HVAC units. In the illustrated embodiment, a building 10 is air conditioned by a system that includes an HVAC unit 12. The building 10 may be a commercial structure or a residential structure. As shown, the HVAC unit 12 is disposed on the roof of the building 10; however, the HVAC unit 12 may be located in other equipment rooms or areas adjacent the building 10. The HVAC unit 12 may be a single package unit containing other equipment, such as a blower, integrated air handler, and/or auxiliary heating unit. In other embodiments, the HVAC unit 12 may be part of a split HVAC system, such as the system shown in FIG. 3, which includes an outdoor HVAC unit 58 and an indoor HVAC unit 56.

The HVAC unit 12 is an air cooled device that implements a refrigeration cycle to provide conditioned air to the building 10. Specifically, the HVAC unit 12 may include one or more heat exchangers across which an air flow is passed to condition the air flow before the air flow is supplied to the building. In the illustrated embodiment, the HVAC unit 12 is a rooftop unit (RTU) that conditions a supply air stream, such as environmental air and/or a return air flow from the building 10. After the HVAC unit 12 conditions the air, the air is supplied to the building 10 via ductwork 14 extending throughout the building 10 from the HVAC unit 12. For example, the ductwork 14 may extend to various individual floors or other sections of the building 10. In certain embodiments, the HVAC unit 12 may be a heat pump that provides both heating and cooling to the building with one refrigeration circuit configured to operate in different modes. In other embodiments, the HVAC unit 12 may include one or more refrigeration circuits for cooling an air stream and a furnace for heating the air stream.

A control device 16, one type of which may be a thermostat, may be used to designate the temperature of the conditioned air. The control device 16 also may be used to control the flow of air through the ductwork 14. For example, the control device 16 may be used to regulate operation of one or more components of the HVAC unit 12 or other components, such as dampers and fans, within the building 10 that may control flow of air through and/or from the ductwork 14. In some embodiments, other devices may be included in the system, such as pressure and/or temperature transducers or switches that sense the temperatures and pressures of the supply air, return air, and so forth. Moreover, the control device 16 may include computer systems that are integrated with or separate from other building control or monitoring systems, and even systems that are remote from the building 10.

Figure 2:
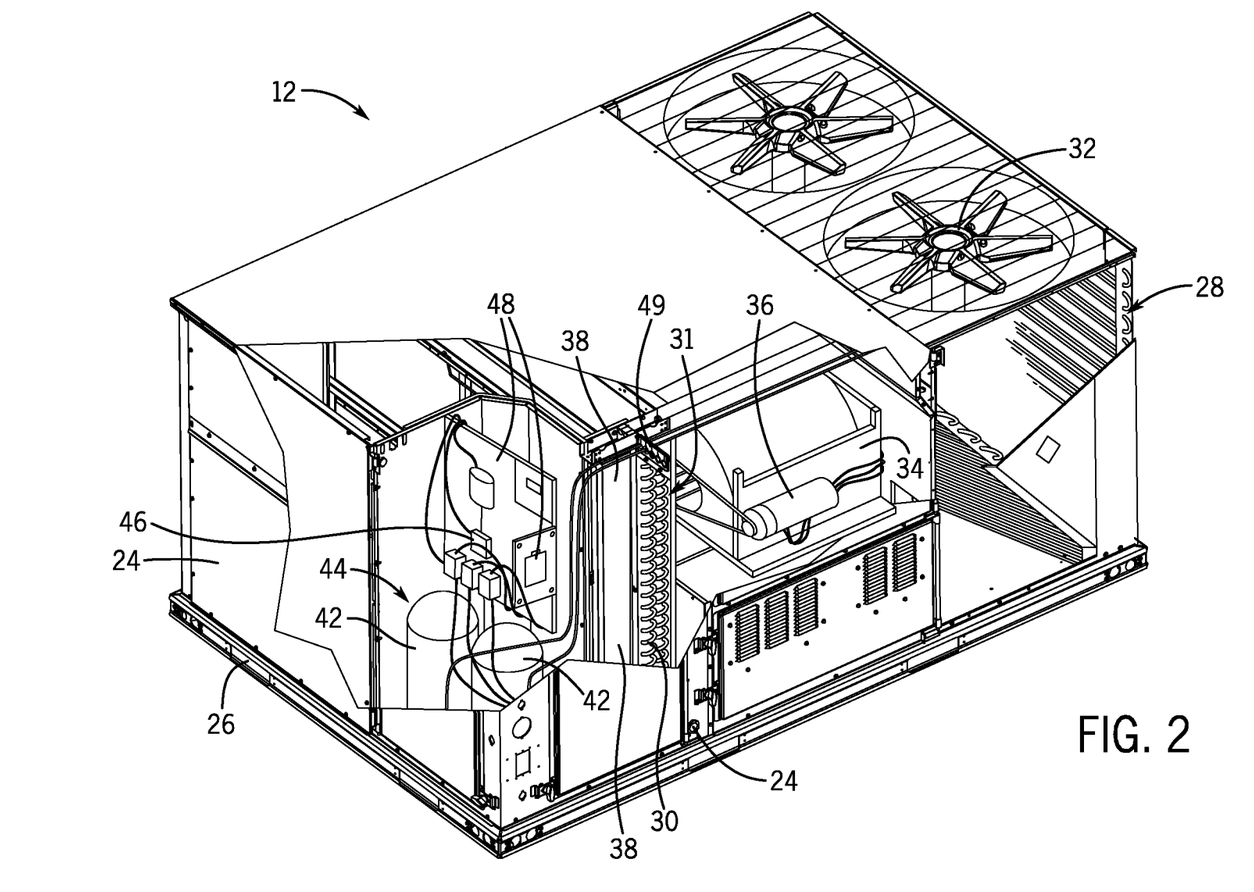
FIG. 2 is an illustration of an embodiment of a packaged unit of the HVAC system, in accordance with the present techniques.

FIG. 2 is a perspective view of an embodiment of the HVAC unit 12. In the illustrated embodiment, the HVAC unit 12 is a single package unit that may include one or more independent refrigeration circuits and components that are tested, charged, wired, piped, and ready for installation. The HVAC unit 12 may provide a variety of heating and/or cooling functions, such as cooling only, heating only, cooling with electric heat, cooling with dehumidification, cooling with gas heat, or cooling with a heat pump. As described above, the HVAC unit 12 may directly cool and/or heat an air stream provided to the building 10 to condition a space in the building 10.

As shown in the illustrated embodiment of FIG. 2, a cabinet 24 encloses the HVAC unit 12 and provides structural support and protection to the internal components from environmental and other contaminants. In some embodiments, the cabinet 24 may be constructed of galvanized steel and insulated with aluminum foil faced insulation. Rails 26 may be joined to the bottom perimeter of the cabinet 24 and provide a foundation for the HVAC unit 12. In certain embodiments, the rails 26 may provide access for a forklift and/or overhead rigging to facilitate installation and/or removal of the HVAC unit 12. In some embodiments, the rails 26 may fit into "curbs" on the roof to enable the HVAC unit 12 to provide air to the ductwork 14 from the bottom of the HVAC unit 12 while blocking elements such as rain from leaking into the building 10.

The HVAC unit 12 includes heat exchangers 28 and 30 in fluid communication with one or more refrigeration circuits. Tubes within the heat exchangers 28 and 30 may circulate refrigerant, such as R-410A, through the heat exchangers 28 and 30. The tubes may be of various types, such as multichannel tubes, conventional copper or aluminum tubing, and so forth. Together, the heat exchangers 28 and 30 may implement a thermal cycle in which the refrigerant undergoes phase changes and/or temperature changes as it flows through the heat exchangers 28 and 30 to produce heated and/or cooled air. For example, the heat exchanger 28 may function as a condenser where heat is released from the refrigerant to ambient air, and the heat exchanger 30 may function as an evaporator where the refrigerant absorbs heat to cool an air stream. In other embodiments, the HVAC unit 12 may operate in a heat pump mode where the roles of the heat exchangers 28 and 30 may be reversed. That is, the heat exchanger 28 may function as an evaporator and the heat exchanger 30 may function as a condenser. In further embodiments, the HVAC unit 12 may include a furnace for heating the air stream that is supplied to the building 10.

While the illustrated embodiment of FIG. 2 shows the HVAC unit 12 having two of the heat exchangers 28 and 30, in other embodiments, the HVAC unit 12 may include one heat exchanger or more than two heat exchangers.

The heat exchanger 30 is located within a compartment 31 that separates the heat exchanger 30 from the heat exchanger 28. Fans 32 draw air from the environment through the heat exchanger 28. Air may be heated and/or cooled as the air flows through the heat exchanger 28 before being released back to the environment surrounding the rooftop unit 12. A blower assembly 34, powered by a motor 36, draws air through the heat exchanger 30 to heat or cool the air. The heated or cooled air may be directed to the building 10 by the ductwork 14, which may be connected to the HVAC unit 12. Before flowing through the heat exchanger 30, the conditioned air flows through one or more filters 38 that may remove particulates and contaminants from the air. In certain embodiments, the filters 38 may be disposed on the air intake side of the heat exchanger 30 to prevent contaminants from contacting the heat exchanger 30.

The HVAC unit 12 also may include other equipment for implementing the thermal cycle. Compressors 42 increase the pressure and temperature of the refrigerant before the refrigerant enters the heat exchanger 28. The compressors 42 may be any suitable type of compressors, such as scroll compressors, rotary compressors, screw compressors, or reciprocating compressors. In some embodiments, the compressors 42 may include a pair of hermetic direct drive compressors arranged in a dual stage configuration 44. However, in other embodiments, any number of the compressors 42 may be provided to achieve various stages of heating and/or cooling. As may be appreciated, additional equipment and devices may be included in the HVAC unit 12, such as a solid-core filter drier, a drain pan, a disconnect switch, an economizer, pressure switches, phase monitors, and humidity sensors, among other things.

The HVAC unit 12 may receive power through a terminal block 46. For example, a high voltage power source may be connected to the terminal block 46 to power the equipment. The operation of the HVAC unit 12 may be governed or regulated by a control board 48. The control board 48 may include control circuitry connected to a thermostat, sensors, and alarms. One or more of these components may be referred to herein separately or collectively as the control device 16. The control circuitry may be configured to control operation of the equipment, provide alarms, and monitor safety switches. Wiring 49 may connect the control board 48 and the terminal block 46 to the equipment of the HVAC unit 12.

Figure 3:
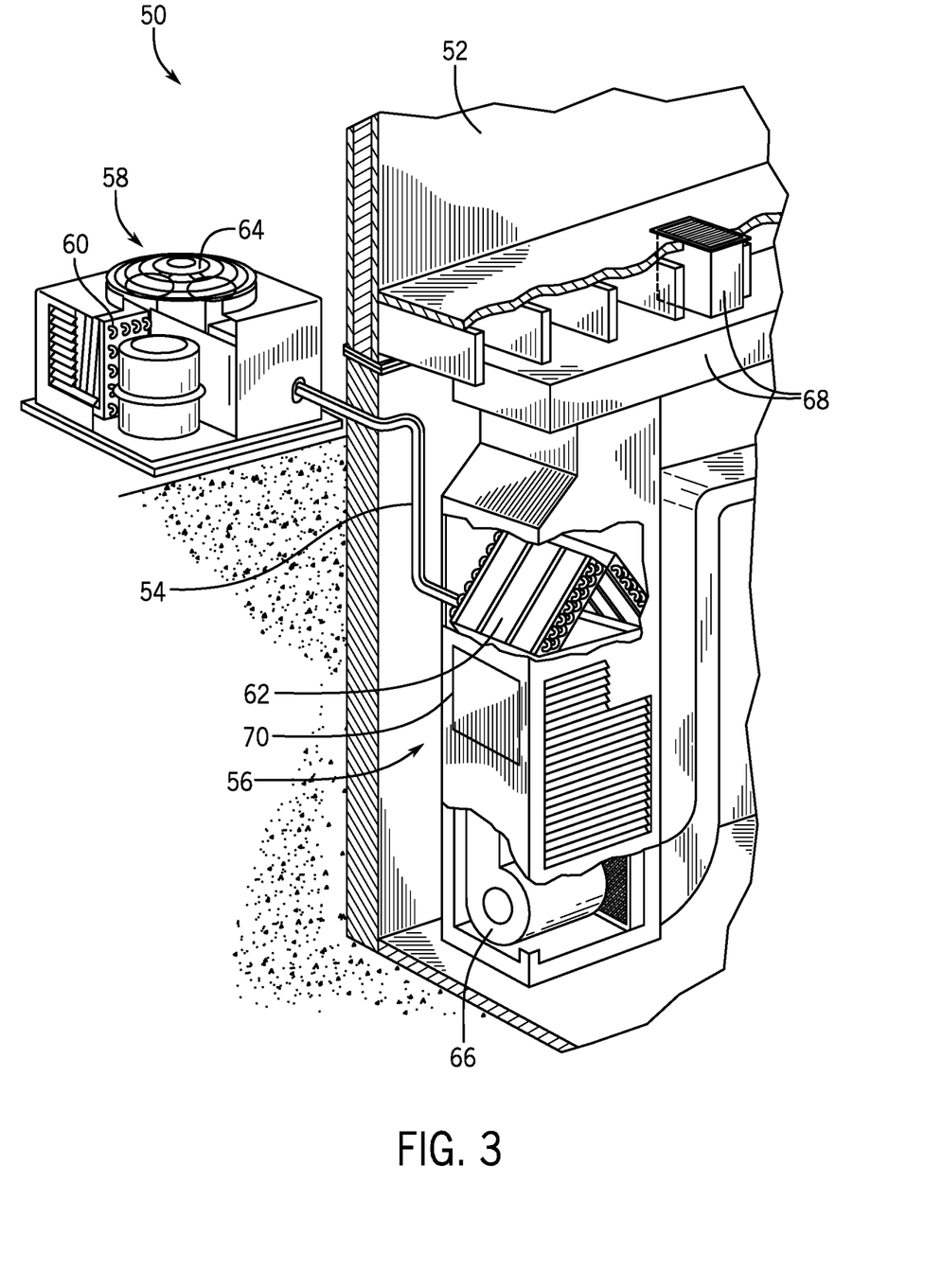
FIG. 3 is an illustration of an embodiment of a split system of the HVAC system, in accordance with the present techniques.

FIG. 3 illustrates a residential heating and cooling system 50, also in accordance with present techniques. The residential heating and cooling system 50 may provide heated and cooled air to a residential structure, as well as provide outside air for ventilation and provide improved indoor air quality (IAQ) through devices such as ultraviolet lights and air filters. In the illustrated embodiment, the residential heating and cooling system 50 is a split HVAC system. In general, a residence 52 conditioned by a split HVAC system may include refrigerant conduits 54 that operatively couple the indoor unit 56 to the outdoor unit 58. The indoor unit 56 may be positioned in a utility room, an attic, a basement, and so forth. The outdoor unit 58 is typically situated adjacent to a side of residence 52 and is covered by a shroud to protect the system components and to prevent leaves and other debris or contaminants from entering the unit. The refrigerant conduits 54 transfer refrigerant between the indoor unit 56 and the outdoor unit 58, typically transferring primarily liquid refrigerant in one direction and primarily vaporized refrigerant in an opposite direction.

When the system shown in FIG. 3 is operating as an air conditioner, a heat exchanger 60 in the outdoor unit 58 serves as a condenser for re-condensing vaporized refrigerant flowing from the indoor unit 56 to the outdoor unit 58 via one of the refrigerant conduits 54. In these applications, a heat exchanger 62 of the indoor unit functions as an evaporator. Specifically, the heat exchanger 62 receives liquid refrigerant, which may be expanded by an expansion device, and evaporates the refrigerant before returning it to the outdoor unit 58.

The outdoor unit 58 draws environmental air through the heat exchanger 60 using a fan 64 and expels the air above the outdoor unit 58. When operating as an air conditioner, the air is heated by the heat exchanger 60 within the outdoor unit 58 and exits the unit at a temperature higher than it entered. The indoor unit 56 includes a blower or fan 66 that directs air through or across the indoor heat exchanger 62, where the air is cooled when the system is operating in air conditioning mode. Thereafter, the air is passed through ductwork 68 that directs the air to the residence 52. The overall system operates to maintain a desired temperature as set by a system controller. When the temperature sensed inside the residence 52 is higher than the set point on the thermostat, or a set point plus a small amount, the residential heating and cooling system 50 may become operative to refrigerate additional air for circulation through the residence 52. When the temperature reaches the set point, or a set point minus a small amount, the residential heating and cooling system 50 may stop the refrigeration cycle temporarily.

The residential heating and cooling system 50 may also operate as a heat pump. When operating as a heat pump, the roles of heat exchangers 60 and 62 are reversed. That is, the heat exchanger 60 of the outdoor unit 58 will serve as an evaporator to evaporate refrigerant and thereby cool air entering the outdoor unit 58 as the air passes over outdoor the heat exchanger 60. The indoor heat exchanger 62 will receive a stream of air blown over it and will heat the air by condensing the refrigerant.

In some embodiments, the indoor unit 56 may include a furnace system 70. For example, the indoor unit 56 may include the furnace system 70 when the residential heating and cooling system 50 is not configured to operate as a heat pump. The furnace system 70 may include a burner assembly and heat exchanger, among other components, inside the indoor unit 56. Fuel is provided to the burner assembly of the furnace 70 where it is mixed with air and combusted to form combustion products. The combustion products may pass through tubes or piping in a heat exchanger, separate from heat exchanger 62, such that air directed by the blower 66 passes over the tubes or pipes and extracts heat from the combustion products. The heated air may then be routed from the furnace system 70 to the ductwork 68 for heating the residence 52.

Figure 4:
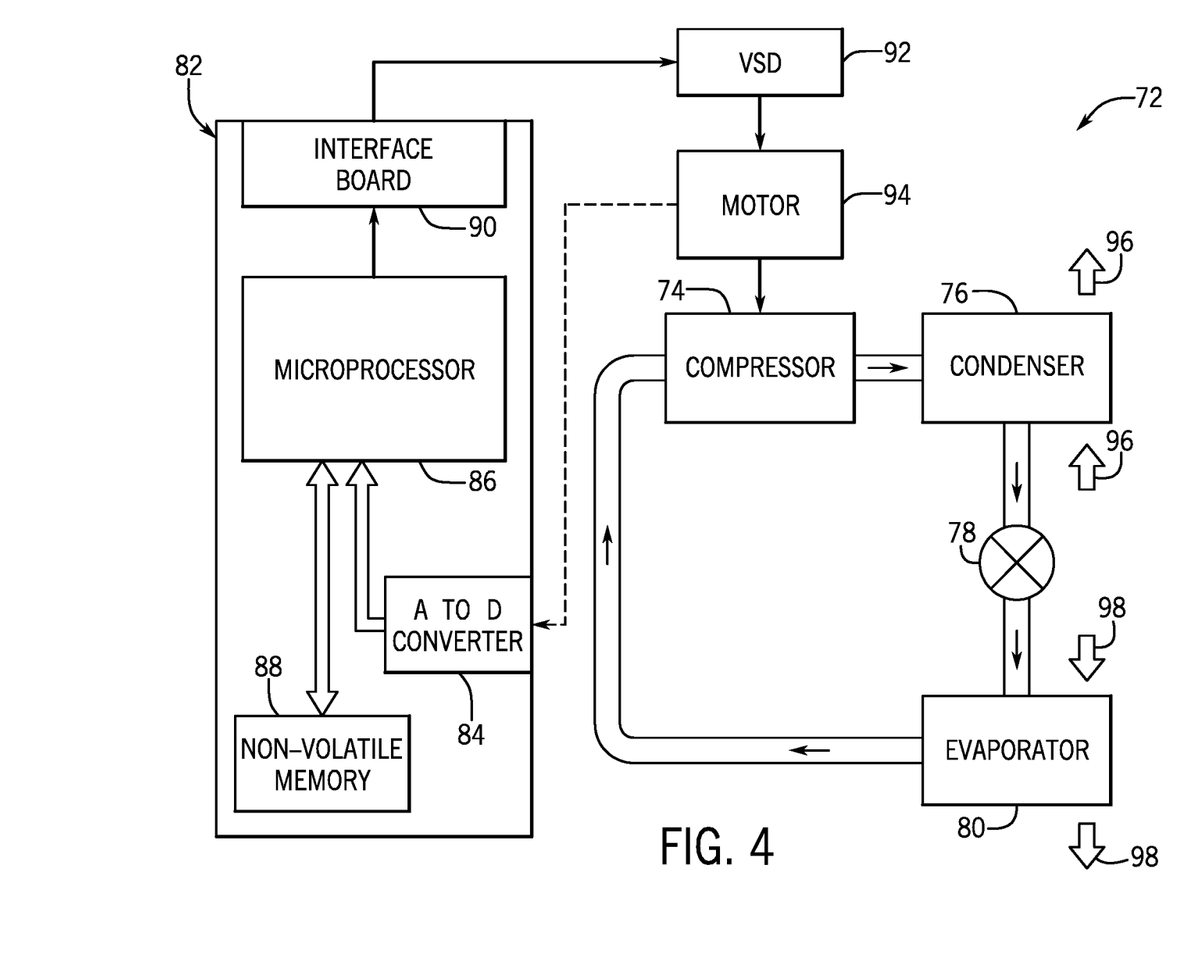
FIG. 4 is a schematic diagram of an embodiment of a refrigeration system of the HVAC system, in accordance with the present techniques.

FIG. 4 is an embodiment of a vapor compression system 72 that can be used in any of the systems described above. The vapor compression system 72 may circulate a refrigerant through a circuit starting with a compressor 74. The circuit may also include a condenser 76, an expansion valve(s) or device(s) 78, and an evaporator 80. The vapor compression system 72 may further include a control panel 82 that has an analog to digital (A/D) converter 84, a microprocessor 86, a non-volatile memory 88, and/or an interface board 90. The control panel 82 and its components may function to regulate operation of the vapor compression system 72 based on feedback from an operator, from sensors of the vapor compression system 72 that detect operating conditions, and so forth.

In some embodiments, the vapor compression system 72 may use one or more of a variable speed drive (VSDs) 92, a motor 94, the compressor 74, the condenser 76, the expansion valve or device 78, and/or the evaporator 80. The motor 94 may drive the compressor 74 and may be powered by the variable speed drive (VSD) 92. The VSD 92 receives alternating current (AC) power having a particular fixed line voltage and fixed line frequency from an AC power source, and provides power having a variable voltage and frequency to the motor 94. In other embodiments, the motor 94 may be powered directly from an AC or direct current (DC) power source. The motor 94 may include any type of electric motor that can be powered by a VSD or directly from an AC or DC power source, such as a switched reluctance motor, an induction motor, an electronically commutated permanent magnet motor, or another suitable motor.

The compressor 74 compresses a refrigerant vapor and delivers the vapor to the condenser 76 through a discharge passage. In some embodiments, the compressor 74 may be a centrifugal compressor. The refrigerant vapor delivered by the compressor 74 to the condenser 76 may transfer heat to a fluid passing across the condenser 76, such as ambient or environmental air 96. The refrigerant vapor may condense to a refrigerant liquid in the condenser 76 as a result of thermal heat transfer with the environmental air 96. The liquid refrigerant from the condenser 76 may flow through the expansion device 78 to the evaporator 80.

The liquid refrigerant delivered to the evaporator 80 may absorb heat from another air stream, such as a supply air stream 98 provided to the building 10 or the residence 52. For example, the supply air stream 98 may include ambient or environmental air, return air from a building, or a combination of the two. The liquid refrigerant in the evaporator 80 may undergo a phase change from the liquid refrigerant to a refrigerant vapor. In this manner, the evaporator 80 may reduce the temperature of the supply air stream 98 via thermal heat transfer with the refrigerant. Thereafter, the vapor refrigerant exits the evaporator 80 and returns to the compressor 74 by a suction line to complete the cycle.

In some embodiments, the vapor compression system 72 may further include a reheat coil in addition to the evaporator 80. For example, the reheat coil may be positioned downstream of the evaporator relative to the supply air stream 98 and may reheat the supply air stream 98 when the supply air stream 98 is overcooled to remove humidity from the supply air stream 98 before the supply air stream 98 is directed to the building 10 or the residence 52.

It should be appreciated that any of the features described herein may be incorporated with the HVAC unit 12, the residential heating and cooling system 50, or other HVAC systems. Additionally, while the features disclosed herein are described in the context of embodiments that directly heat and cool a supply air stream provided to a building or other load, embodiments of the present disclosure may be applicable to other HVAC systems as well. For example, the features described herein may be applied to mechanical cooling systems, free cooling systems, chiller systems, or other heat pump or refrigeration applications.

Moreover, in accordance with the present techniques, a row split coil system or configuration may be incorporated in any of the HVAC systems illustrated in FIGS. 1-4. For example, the row split coil system may be included within the heat exchanger 28 and/or the heat exchanger 30 of the HVAC unit 12 of FIG. 2, the heat exchanger 60 and/or the heat exchanger 62 of the residential heating and cooling system 50 of FIG. 3, or any other suitable heat exchanger of an HVAC system having two or more than two refrigeration circuits. That is, the row split coil system may be included within the condenser and/or the evaporator of any suitable multiple-circuit HVAC system. As discussed herein, the row split coil system enables a reduction in temperature lift and an increase in operating efficiency for each heat exchanger having a row split configuration by sequentially nesting the coils of each refrigeration circuit within one another. The row split coil system will be described in detail below with reference to FIGS. 5-8.

Figure 5:
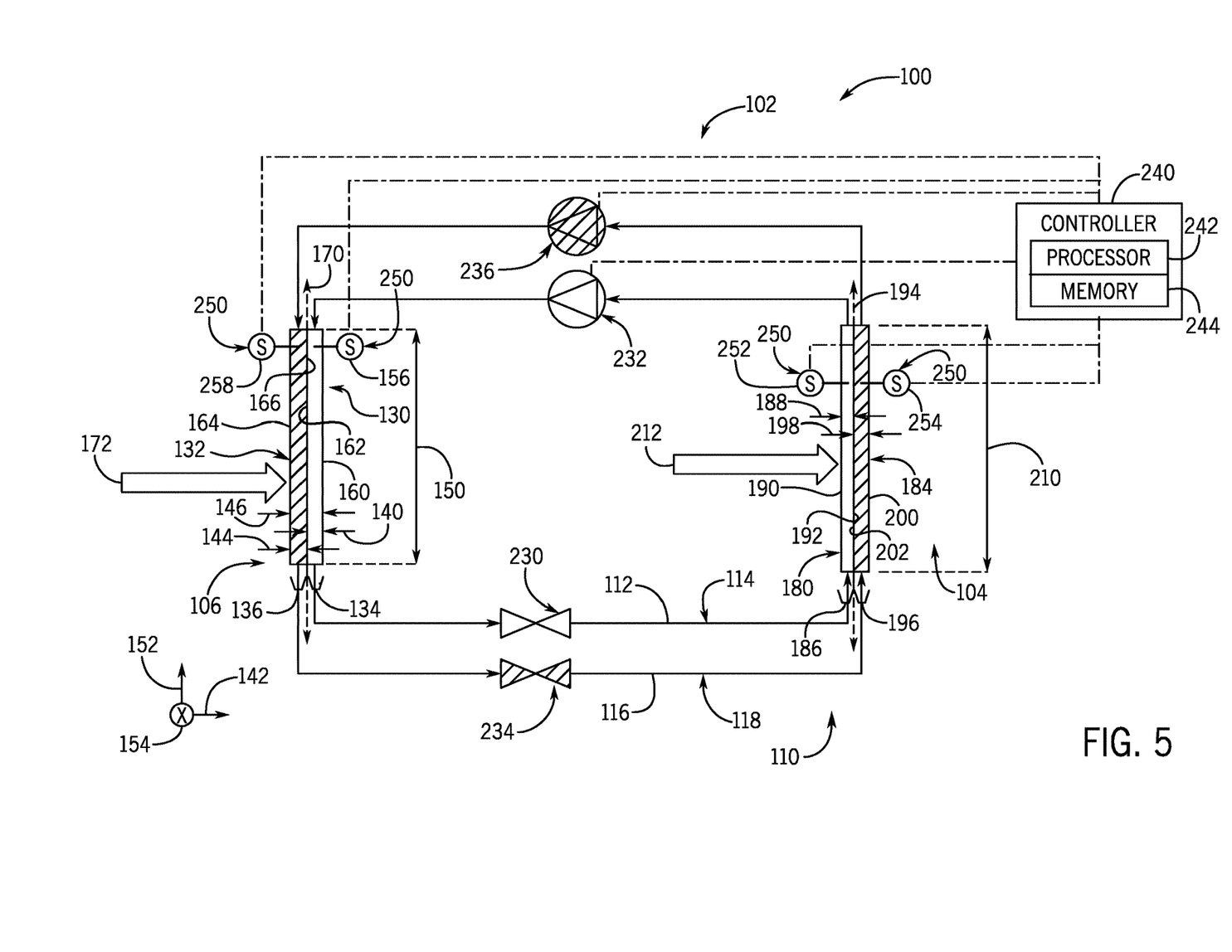
FIG. 5 is a schematic diagram of an HVAC system having a row split coil system, in accordance with the present techniques.

FIG. 5 is a schematic diagram of an HVAC system 100 or multiple-circuit heating and cooling system having a row split coil system 102 that includes a row split evaporator 104 and a row split condenser 106, in accordance with the present techniques. The HVAC system 100 may include a dual or multiple-circuit refrigeration system 110, such that a first refrigerant 112 flows along a first refrigeration circuit 114 and a second refrigerant 116 flows along a second refrigeration circuit 118. As illustrated, the first refrigeration circuit 114 is nested within the second refrigeration circuit 118. The first refrigerant 112 and the second refrigerant 116 may each include a same or similar refrigerant. Additionally, the first refrigerant 112 and the second refrigerant 116 may be fluidly and/or thermally isolated or separated from one another in some embodiments.

As illustrated, the row split condenser 106 includes a first condenser coil 130 for the first refrigeration circuit 114 and a second condenser coil 132 for the second refrigeration circuit 118. More particularly, the first condenser coil 130 may include tubing or a first tube row 134 that is directly adjacent or longitudinally adjacent to tubing or a second tube row 136 of the second condenser coil 132. That is, the first condenser coil 130 may define a first partial coil depth 140 or width of the row split condenser 106 extending along an x-axis 142, while the second condenser coil 132 may define a second partial coil depth 144 of the row split condenser 106 defined along the x-axis 142. A coil depth 146 or complete depth of the row split condenser 106 is therefore defined by both the first partial coil depth 140 and the second partial coil depth 144. As referred to herein, the depths of the row split condenser 106 are defined with reference to a direction in which air passes through or is drawn through the row split condenser 106. Additionally, the row split condenser 106 includes a coil height 150 extending along a y-axis 152, as well as a coil length extending into the page along a z-axis 154.

Thus, in contrast to a stacked condenser that has condenser coils separated along a plane defined by the x-axis 142 and the y-axis 152, or an interlaced condenser that has condenser coils partially on a first side of the interlaced condenser and partially on a second side of the interlaced condenser, the first condenser coil 130 and the second condenser coil 132 are separated along a plane generally defined by the y-axis 152 and the z-axis 154. For example, the first condenser coil 130 may include an outward-facing surface 160 and an inward-facing surface 162 that is opposite of the outward-facing surface 160, while the second condenser coil 132 may include an outward-facing surface 164 and an inward-facing surface 166 that is opposite of the outward-facing surface 164. The inward-facing surfaces 162, 166 of the condenser coils 130, 132 may be longitudinally inward relative to each other, and/or relative to a vertical centerline 170 of the row split condenser 106 extending along the y-axis 152. Thus, the inward-facing surfaces 162, 166 face one another, and in some embodiments, may be in contact with one another. As such, an air flow 172 drawn across the row split condenser 106 by a blower or fan may flow sequentially through both the second condenser coil 132 and then first condenser coil 130 in series, with substantially no air bypass. Thus, the air flow 172 may contact each condenser coil 130, 132 when flowing along the x-axis 142. As referred to herein, the row split condenser 106 therefore has a nested slab configuration in which the first condenser coil 130 is downstream of the second condenser coil 132 relative to the air flow 172.

Similarly, the row split evaporator 104 includes a first evaporator coil 180 for the first refrigeration circuit 114 and a second evaporator coil 184 for the second refrigeration circuit 118. For example, the first evaporator coil 180 may include a first tube row 186 defining a first partial coil depth 188 for the row split evaporator 104, an outward-facing surface 190, and an inward-facing surface 192 relative to a vertical centerline 194 of the row split evaporator 104. The second evaporator coil 184 may similarly include a second tube row 196 defining a second partial coil depth 198 for the row split evaporator 104, an outward-facing surface 200, and an inward-facing surface 202. As such, the row split evaporator 104 may have a coil depth 206 equal to the partial coil depths 188, 198 added together, and each evaporator coil 180, 184 may define a coil height 210 of the row split evaporator 104 extending along the y-axis 152 and a coil length of the row split evaporator 104 extending along the z-axis 154.

Thereby, an air flow 212 may be drawn into the row split evaporator 104 and sequentially contact the first evaporator coil 180 and the second evaporator coil 184 in series when flowing along the x-axis 142. As referred to herein, the row split evaporator 104 therefore has a nested slab configuration in which the second evaporator coil 184 is downstream of the first evaporator coil 180 relative to the air flow 212. However, in some embodiments, the row split evaporator 104 may be excluded from the HVAC system 100 and replaced by an evaporator having different configuration, such as an interlaced or stacked evaporator. In such embodiments, the row split condenser 106 provides a reduced temperature lift and improved efficiently compared to an HVAC system having both a condenser and an evaporator without a row split configuration due to the air flow 172 passing through the row split condenser 106 with reduced or eliminated air bypass.

Additionally, a first expansion device 230 and a first compressor 232 may be included within the first refrigeration circuit 114, and a second expansion device 234 and a second compressor 236 may be included within the second refrigeration circuit 118. Therefore, the first refrigerant 112 may flow within refrigerant conduits coupled between the first condenser coil 130, the first expansion device 230, the first evaporator coil 180, and the first compressor 232. Similarly, the second refrigerant 116 may flow within refrigerant conduits between the second condenser coil 132, the second expansion device 234, the second evaporator coil 184, and the second compressor 236. Although illustrated and discussed herein as having the first refrigeration circuit 114 nested within the second refrigeration circuit 118, it is to be understood that the components may be disposed in a different arrangement, such that the second refrigeration circuit 118 is nested within the first refrigeration circuit 114. Moreover, the term "nested" is intended to refer to the main heat exchanging surfaces of the row split condenser 106 and the row split evaporator 104. As such, the components coupled therebetween, such as the compressors 232, 236 and the expansion devices 230, 234, may be arranged in any suitable position that enables the air flows 172, 212 to sequentially exchange thermal energy with the first refrigerant 112 and the second refrigerant 116 of the row split condenser 106 and the row split evaporator 104 in reverse order relative to one another.

Further, a controller 240 may be communicatively coupled to the first compressor 232 and the second compressor 236 to instruct the first compressor 232 and/or the second compressor 236 to activate, thereby driving the first refrigerant 112 and/or the second refrigerant 116 along the first refrigeration circuit 114 and/or the second refrigeration circuit 118, respectively. The controller 240 of the HVAC system 100 may include a processor 242, such as the microprocessor 86 discussed above, and a memory 244, such as the non-volatile memory 88 discussed above, to control how the HVAC system 100 conditions an interior space of the building 10 or the residence 52. In some embodiments, the controller 240 may determine a coefficient of performance or another suitable parameter of the first compressor 232 and the second compressor 236, and then instruct the first compressor 232 and/or the second compressor 236 to actuate based on a conditioning demand of the building 10 and the respective coefficient of performance for the actuated compressor 232, 236. Additionally, although discussed with reference to the HVAC system 100 having two refrigeration circuits, it is to be understood that the present techniques may be extended to HVAC systems having more than two refrigeration circuits, such as discussed below with reference to FIG. 6, and/or to other types of conditioning systems, such as those including furnaces and/or heat pumps.

The HVAC system 100 may additionally include sensors 250 communicatively coupled to the controller 240 for monitoring various components of the HVAC system 100. Moreover, the term "sensor" may include any suitable instrument capable of acquiring the feedback through direct or indirect observation indicators. For example, the sensors 250 may include a first evaporator sensor 252 for determining an evaporating temperature of the first refrigerant 112 within the first evaporator coil 180 and a second evaporator sensor 254 for determining an evaporating temperature of the second refrigerant 116 within the second evaporator coil 184. Additionally, the sensors 250 may include a first condenser sensor 256 for determining a condensing temperature of the first refrigerant 112 within the first condenser coil 130 and a second condenser sensor 258 for determining a condensing temperature of the second refrigerant 116 within the second condenser coil 132. As discussed in more detail with reference to FIG. 8, the temperature lift for each refrigeration circuit 114, 118 may be determined as the difference between the condensing temperature and the evaporating temperature within each refrigeration circuit 114, 118.

By including the row split condenser 106 and the row split evaporator 104, the temperature lift for the refrigeration circuits 114, 118 may be reduced compared to traditional HVAC systems having similarly-sized heat exchangers of a different configuration. Indeed, lower temperature lift corresponds to a reduced entropy generation and thus an increased coefficient of performance for the compressors 232, 236. Thus, the compressors 232, 236 of the HVAC system 100 may operate with the increased coefficient of performance and a lower specific compressor work, improving an operating efficiency of the HVAC system 100. Additionally, the row split coil system 102 may provide improved dehumidification performance in part load operation of the HVAC system 100 because the air flow 212 passes through at least one active coil of the row split evaporator 104 during part load operation, such that air bypass is reduced or eliminated. Similarly, the row split condenser 106 enables more thermal energy to be transferred between the refrigerants 112, 116 as the air flow 172 also passes through at least one active coil of the row split condenser 106 during part load operation.

Figure 6:
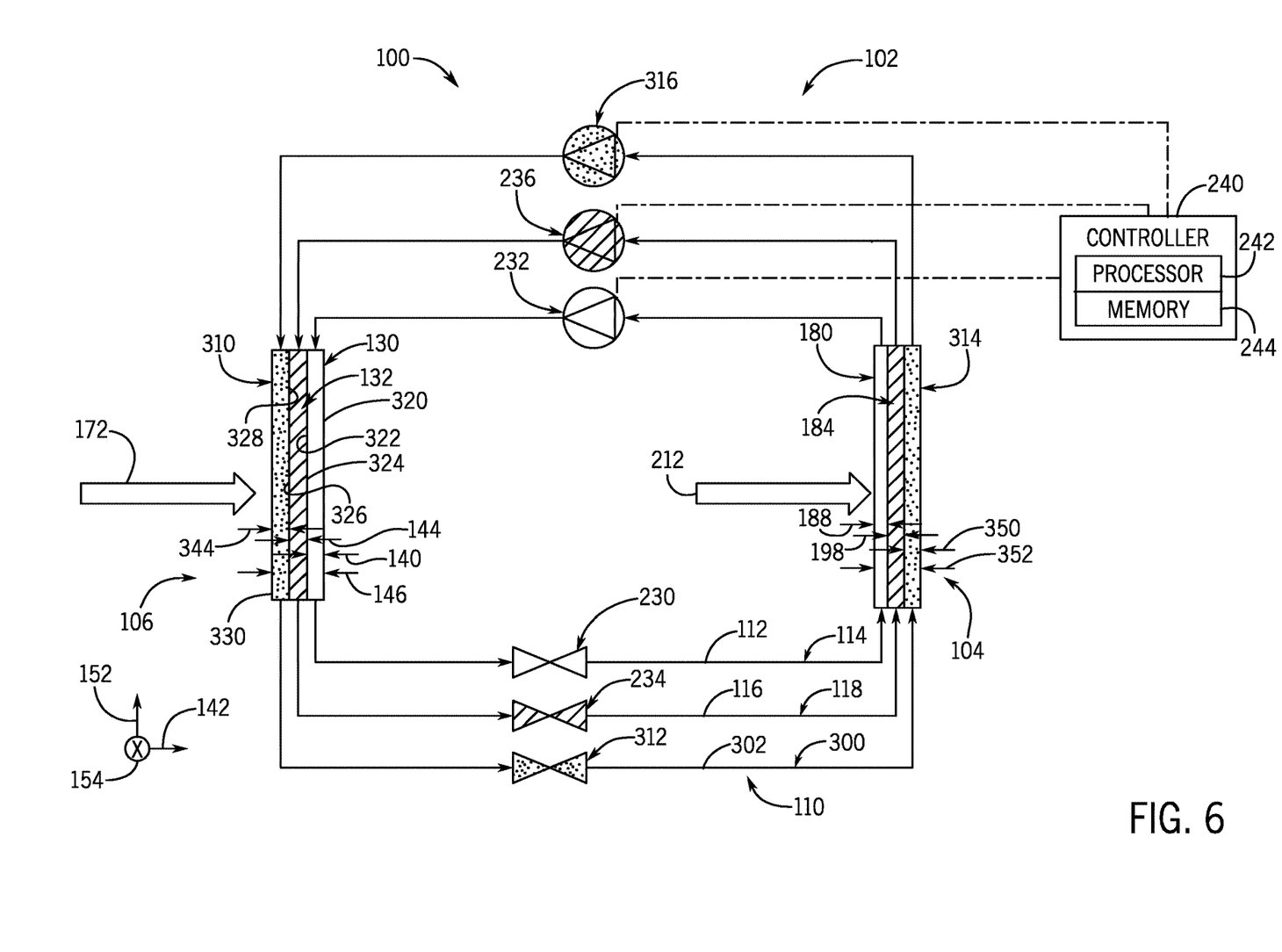
FIG. 6 is a schematic diagram of a row split coil system having three refrigeration circuits, in accordance with the present techniques.

FIG. 6 is a schematic diagram of the row split coil system 102 of the HVAC system 100 having a third refrigeration circuit 300 in addition to the first refrigeration circuit 114 and the second refrigeration circuit 118, in accordance with the present techniques. In the illustrated embodiment, the multiple-circuit refrigeration system 110 of the HVAC system 100 may be a triple circuit refrigeration system, such that the first refrigerant 112 flows along the first refrigeration circuit 114, the second refrigerant 116 flows along the second refrigeration circuit 118, and a third refrigerant 302 flows along the third refrigeration circuit 300. The third refrigerant 302 may be same or different from the first refrigerant 112 and/or the second refrigerant 116. Additionally, the first refrigerant 112, the second refrigerant 116, and the third refrigerant 302 may be fluidly and/or thermally isolated or separated from one another in some embodiments, such as by a conductive break in heat transfer fins, as discussed below with reference to FIG. 7.

As illustrated, the third refrigeration circuit 300 includes similar elements to the elements of the first refrigeration circuit 114 and the second refrigeration circuit 118, which are described in detail above with reference to FIG. 5. For example, the third refrigeration circuit 300 includes a third condenser coil 310 of the row split condenser 106, a third expansion device 312, a third evaporator coil 314 of the row split evaporator 104, and a third compressor 316 that may drive the third refrigerant 302 within the third refrigeration circuit 300 based on actuation by the controller 240. More particularly, the third condenser coil 310 is adjacent or longitudinally adjacent to the second condenser coil 132, such that the second condenser coil 132 is disposed between the first condenser coil 130 and the third condenser coil 310 when viewed along the x-axis 142. As such, a first surface 320 of the first condenser coil 130 is outward-facing relative to the other condenser coils 132, 310, a second surface 322 of the first condenser coil 130 is facing a first surface 324 of the second condenser coil 132, a second surface 326 of the second condenser coil 132 is facing a first surface 328 of the third condenser coil 310, and a second surface 330 of the third condenser coil 310 is outward-facing relative to the other condenser coils 130, 132. In some embodiments, the condenser coils 130, 132, 310 are formed as one unit or multiple units that are disposed within the row split condenser 106.

In other words, the first condenser coil 130 defines the first partial coil depth 140 of the row split condenser 106, the second condenser coil 132 defines the second partial coil depth 144 of the row split condenser 106, and the third condenser coil 310 defines a third partial coil depth 344 of the row split condenser 106, each defined along the x-axis 142. Thus, the coil depth 146 of the row split condenser 106 may be longer for embodiments with more condenser coils than embodiments with less condenser coils. As such, the air flow 172 drawn through the row split condenser 106 is pulled sequentially through the three condenser coils 310, 132, 130 in series, providing heat transfer with each refrigerant 112, 116, 302 within the refrigeration circuits 114, 118, 300. As such, during part load operation of the HVAC system 100 in which one or two compressors 232, 236, 316 of the refrigeration circuits 114, 118, 300 are actuated by the controller 240, the air flow 172 contacts the corresponding one or two activated refrigeration circuits 114, 118, 300.

Similar to the row split condenser 106, the row split evaporator 104 may include the third evaporator coil 314, such that the first evaporator coil 180 defines the first partial coil depth 188 of the row split evaporator 104, the second evaporator coil 184 defines the second partial coil depth 198 of the row split evaporator 104, and the third evaporator coil 314 defines a third partial coil depth 350 of the row split evaporator 104, each defined along the x-axis 142 and collectively equal to a coil depth 352 or complete coil depth of the row split evaporator 104. Because the third refrigeration circuit 300 is sequentially nested outside of the second refrigeration circuit 118 and the first refrigeration circuits 114, the third evaporator coil 314 is disposed downstream of the second evaporator coil 184 and the first evaporator coil 180, while the third condenser coil 310 is disposed upstream of the second condenser coil 132 and the first condenser coil 130.

Therefore, in embodiments in which the HVAC system 100 is operating at full or part load, the air flow 212 may exchange heat with flowing refrigerant within each evaporator coil 180, 184, 314 and the air flow 172 may exchange heat with flowing refrigerant within each condenser coil 130, 132, 310. During the part load operation of the HVAC system 100, the air flows 172, 212 drawn through the row split condenser 106 and the row split evaporator 104 exchange heat with the flowing refrigerant within active tube rows of the activated refrigeration circuits 114, 118, 300. Thus, the air flows 172, 212 are not drawn through only inactive coil portions, such that improved dehumidification perforce is provided by the row split coil system 102 during part load operation. Indeed, as discussed in more detail with reference to FIG. 8, the row split coil system 102 reduces a temperature lift for the row split evaporator 104 and the row split condenser 106 compared to traditional stacked or interlaced coils for improved operation thereof.

Figure 7:
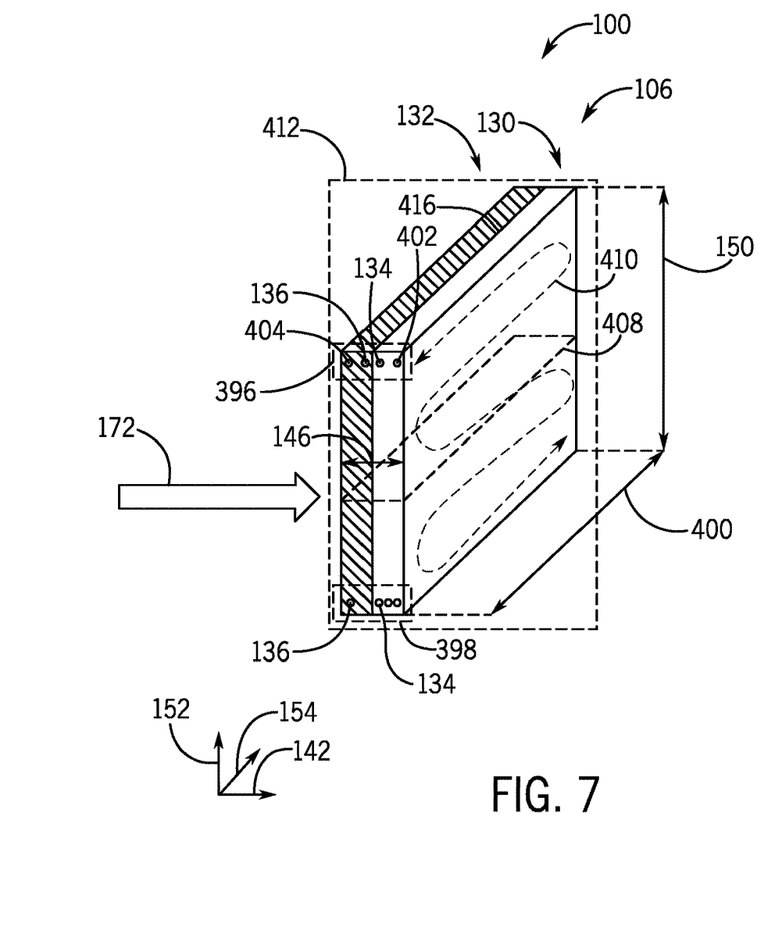
FIG. 7 is a perspective diagram of a row split condenser of the row split coil system of FIG. 5, in accordance with the present techniques.

Looking to more details of the row split condenser 106, FIG. 7 is a perspective diagram of the row split condenser 106 having the first condenser coil 130 and the second condenser coil 132, in accordance with the present techniques. The row split condenser 106 includes the coil depth 146 extending along the x-axis 142, the coil height 150 extending along the y-axis 152, and a coil length 400 extending along the z-axis 154. As illustrated, the row split configuration of the row split condenser 106 refers to the separation or split between the first condenser coil 130 and the second condenser coil 132, as defined by a plane extending between the y-axis 152 and the z-axis 154. That is, the first condenser coil 130 includes tube rows that extend along the z-axis 154 in a generally parallel orientation to tubing or tube rows of the second condenser coil 132. As discussed herein, generally parallel tube rows refer to tube rows extending along a same direction within 5 percent, 10 percent, 15 percent, and so forth from one another. Moreover, although referred to herein as the row split condenser 106 having generally rectangular condenser coils, it is to be understood that the row split condenser may take any suitable shape, including that of a curved outside unit or residential outdoor condenser coil, V-shaped condenser coils, and so forth. In such embodiments, the row split configuration may include a first coil nested within or underneath a second coil, such that a fan may draw an air flow through the second coil and the first coil in series or sequentially. It is to be understood that the row split evaporator 104 may include similar features to the features discussed herein with reference to the row split condenser 106.

As illustrated, the first condenser coil 130 may include the first tube row 134 and second condenser coil 132 may include the second tube row 136, adjacent to the first tube row 134. Additionally, each coil may include multiple tube rows. For example, as illustrated by a first optional tube arrangement 396, the first condenser coil 130 may additionally include a third tube row 402 and the second condenser coil 132 may additionally include a fourth tube row 404, such that each condenser coil 130, 132 includes two tube rows 134, 136, 402, 404. The tube rows 134, 136, 402, 404 may each generally define a serpentine path 410 extending along the coil length 400 and the coil height 150 of the row split condenser 106. In some embodiments in which the row split condenser 106 is a plate-fin heat exchanger, first heat exchange fins may thermally couple the first tube row 134 and the third tube row 402, which may each carry the first refrigerant 112 therein, while second heat exchange fins thermally couple the second tube row 136 and the fourth tube row 404, which may each carry the second refrigerant 116 therein.

Although discussed above with reference to the first condenser coil 130 having two tube rows 134, 402 and the second condenser coil 132 having two tube rows 136, 404, it is to be understood that the condenser coils 130, 132 may alternatively include unequal quantities of tube rows, such that more condensing is performed in one condenser coil 130, 132 than the other condenser coil 130, 132. For example, as illustrated by a second optional tube arrangement 398, the first condenser coil 130 may include three tube rows 134, 402, 404, while the second condenser coil 132 includes one tube row 136. As such, the row split condenser 106 may include any suitable quantity of tube rows within any suitable number of condenser coils, such that a desired amount or level of condensing is performed for each refrigeration circuit 114, 118.

In some embodiments, the first condenser coil 130 and the second condenser coil 132 are manufactured as a unitary or connected unit having a shared structural element. The shared structural element may be any suitable structural component, such as a tubesheet 408 supporting tubes of the tube rows 134, 136, 402, 404 of the condenser coils 130, 132 and/or a housing 412 or enclosure extending around the condenser coils 130, 132. In embodiments in which the row split condenser 106 is a plate-fin heat exchanger formed as a unitary unit, a conductive break or notch 416 may be formed between the first condenser coil 130 and the second condenser coil 132 to block or eliminate cross-conduction of thermal energy between the first refrigerant 112 and the second refrigerant 116. The notch 416 may be a portion of the row split condenser 106 without heat transfer fins. The notch 416 may be formed during or after construction of the row split condenser 106. In embodiments in which the row split condenser 106 is formed as a unitary unit, construction costs for the row split condenser 106 may be reduced compared to embodiments in which the condenser coils 130, 132 are formed separately and then disposed or coupled together thereafter. The row split coil system 102 may be extended to other types of heat exchangers as well, such as microchannel heat exchangers.

Because the air flow 172 travels though the row split condenser 106 along the x-axis 142, the air flow 172 may contact each tube row 134, 136, 402, 404 of the row split condenser 106 in series in some embodiments. In this manner, when at least one refrigeration circuit 114, 118 is activated, the air flow 172 traveling though the row split condenser 106 flows into the row split condenser 106 and passes over the tubing therein to exchange heat with or remove heat from the corresponding flowing refrigerant 112, 116 within the active condenser coils 130, 132. Additionally, the air flow 212 travels through the row split evaporator 104 and contacts the active evaporator coils 180, 184 in a reversed order compared to that in which the condenser coils 130, 132 are contacted. Thus, air bypass of the air flows 172, 212 is blocked or eliminated, such that more thermal energy is transferred within the row split condenser 106 to reduce temperature lift and improve the coefficient of performance of the compressors 232, 236 of the HVAC system 100.

Figure 8:
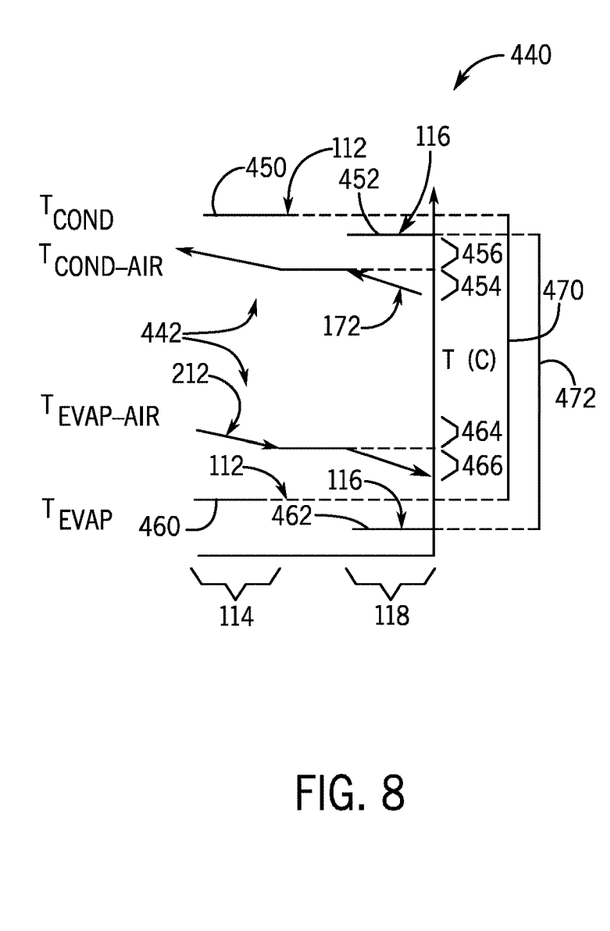
FIG. 8 is a graphical representation of an embodiment of a temperature lift profile of the HVAC system having the row split coil system of FIG. 5, in accordance with the present techniques.

FIG. 8 is a graphical representation 440 of an embodiment of a temperature lift profile 442 of the HVAC system 100, shown as a function of temperature (T) in Celsius (C) for each refrigeration circuit 114, 118, in accordance with the present techniques. The temperature lift profile 442 may be determined by the controller 240 or by another controller or device communicatively coupled to the controller 240. As mentioned above, the temperature lift for each refrigeration circuit 114, 118 refers to a difference between a saturated condensing temperature and a saturated evaporating temperature for the refrigerant within a same refrigeration circuit. The illustrated temperatures may be determined based on signals from the sensors 250 discussed above and/or based on determinations made by or stored within the controller 240. Additionally, although described herein with reference to temperature, any other suitable parameter representative of temperature, or another suitable parameter such as pressure may be used by the row split coil system 102 instead.

For example, during full load operation of the HVAC system 100, the first condenser coil 130 may have a first condensing refrigerant temperature 450 and the second condenser coil 132 may have a second condensing refrigerant temperature 452, which is lower than the first condensing refrigerant temperature 450. As the air flow 172 is drawn into the row split condenser 106, the air flow 172 first contacts the second condenser coil 132 and changes temperature by a first condenser air temperature differential 454, while the second refrigerant 116 condenses at the second condensing refrigerant temperature 452. Then, the air flow 172 contacts the first condenser coil 130 and changes temperature by a second condenser air temperature differential 456, while the first refrigerant 112 condenses at the first condensing refrigerant temperature 450. Moreover, at the row split evaporator 104, the first evaporator coil 180 is at a first evaporating refrigerant temperature 460 and the second evaporator coil 184 is at a second evaporating refrigerant temperature 462, lower than the first evaporating refrigerant temperature 460. As the air flow 212 is drawn into the row split evaporator 104, the air flow 212 may first contact the first evaporator coil 180 and lower in temperature by a first evaporator air temperature differential 464, while the first refrigerant 112 evaporates at the first evaporating refrigerant temperature 460. Then, the air flow 212 proceeds to contact the second evaporator coil 184 and changes temperature by a second evaporator air temperature differential 466, while the second refrigerant 116 evaporates at the second evaporating refrigerant temperature 462.

In the present embodiment, the first condenser air temperature differential 454 generally approximates, such as within a 5% difference of, the second condenser air temperature differential 456 because the first condenser coil 130 is generally a same size or has a same quantity of tube rows as the second condenser coil 132. Additionally, the first evaporator air temperature differential 464 generally approximates the second evaporator air temperature differential 466 because the first evaporator coil 180 is generally a same size or has a same quantity of tube rows as the second evaporator coil 184. However, in other embodiments in which one refrigeration circuit 114, 118 has more tube rows, more heat transfer fins, or another parameter indicative of an increased capacity, the temperature differentials between the refrigeration circuits 114, 118 may be different from one another, such that one refrigeration circuit 114, 118 may provide more conditioning capacity than the other refrigeration circuit 114, 118.

As such, a first temperature lift 470 of the first refrigeration circuit 114 may therefore be determined as the difference between the first condensing refrigerant temperature 450 and the first evaporating refrigerant temperature 460. Additionally, a second temperature lift 472 of the second refrigeration circuit 118 may be determined as the difference between the second condensing refrigerant temperature 452 and the second evaporating refrigerant temperature 462. In the present embodiment, the first temperature lift 470 and the second temperature lift 472 may be generally a same temperature difference, such as within 5 percent or 10 percent in value from one another. The temperature lifts 470, 472 for the refrigeration circuits 114, 118 may be generally indicative of the respective coefficient of performance for the refrigeration circuits 114, 118. For example, lower temperature lifts for the refrigeration circuits 114, 118 may generally correspond to higher coefficients of performance for the refrigeration circuits 114, 118 due to an increase in a compressor capacity and/or a reduced power consumption for the compressors 232, 236 for a given compressor capacity. The present row split coil system 102 may include temperature lifts that are lower than corresponding temperature lifts associated with traditional HVAC systems having stacked or interlaced coils in the condenser and/or the compressor. As such, the present row split coil system 102 enables the HVAC system 100 to operate more efficiently than the traditional HVAC systems having the stacked or interlaced coils.

For example, by decreasing the condensing temperature and/or by increasing the evaporating temperature by one degree Celsius for each refrigeration circuit 114, 118, the coefficient of performance for the HVAC system 100 may be increased by 1 percent, 2 percent, 3 percent, 4 percent, 5 percent, or more, thereby decreasing operating costs for the compressors 232, 236 by a corresponding percentage. Additionally, the improvement in coefficient of performance may be greater for HVAC systems 100 having a lower coefficient of performance in some embodiments. Moreover, the operational benefits provided by the row split configuration of the row split coil system 102 may be combined with traditional efficiency improving methods, such as providing more heat transfer fins or heat exchange surface area, to further improve the operating efficiency of the HVAC system 100.

Accordingly, the present disclosure is directed to a row split coil system for increasing operating efficiency of an HVAC system having two or more than two refrigeration circuits nested within one another. A first condenser coil of a first refrigeration circuit may be disposed adjacent to a second condenser coil of a second refrigeration circuit, such that a row split condenser is formed. Additionally, the HVAC system may include a row split evaporator having a first evaporator coil of the first refrigeration circuit adjacent to a second evaporator coil of the second refrigeration circuit. The condenser and/or the evaporator may therefore include row split configurations that enable air flows to sequentially contact the coils of the condenser and/or the evaporator in a reversed order relative to one another, thereby lowering a temperature lift for each refrigeration coil compared to a temperature lift of a traditional interlaced or stacked coil configuration. The lower temperature lift corresponds to a reduced coefficient of performance for each compressor of the HVAC system, such that the compressors may use a reduced amount of power to provide a same amount of compressor work and/or cooling capacity to the HVAC system.

While only certain features and embodiments of the present disclosure have been illustrated and described, many modifications and changes may occur to those skilled in the art, such as variations in sizes, dimensions, structures, shapes and proportions of the various elements, values of parameters, mounting arrangements, use of materials, colors, orientations, and so forth, without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the present disclosure. Furthermore, in an effort to provide a concise description of the exemplary embodiments, all features of an actual implementation may not have been described, such as those unrelated to the presently contemplated best mode of carrying out the present disclosure, or those unrelated to enabling the claimed disclosure. It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A multiple-circuit heating and cooling system, comprising:
   a first refrigeration circuit comprising a first condenser and a first evaporator; and
   a second refrigeration circuit comprising a second condenser and a second evaporator,
   wherein the first condenser and the second condenser are arranged in a first row split configuration, and the first condenser is entirely downstream of the second condenser relative to a first air flow directed across the second condenser and the first condenser,
   wherein the first evaporator and the second evaporator are arranged in a second row split configuration, and the second evaporator is entirely downstream of the first evaporator relative to a second air flow directed across the first evaporator and the second evaporator, and
   wherein the multiple-circuit heating and cooling system is configured to discharge the second air flow toward a conditioned space to cool the conditioned space.

2. The multiple-circuit heating and cooling system of claim 1, wherein the first condenser and the second condenser each comprise multiple rows of condenser tubes, and wherein the first evaporator and the second evaporator each comprise multiple rows of evaporator tubes.

3. The multiple-circuit heating and cooling system of claim 1, wherein the first condenser and the second condenser are part of an outside unit of the multiple-circuit heating and cooling system, and wherein the second condenser is aligned within the first condenser.

4. The multiple-circuit heating and cooling system of claim 1, wherein, during part-load operation of the multiple-circuit heating and cooling system, the multiple-circuit heating and cooling system is configured to direct the first air flow across the first condenser to exchange heat with a first refrigerant flowing therethrough.

5. The multiple-circuit heating and cooling system of claim 4, wherein the first condenser comprises active tubing during the part-load operation of the multiple-circuit heating and cooling system, and wherein the first air flow is configured to pass through the first condenser during the part-load operation without bypassing the active tubing.

6. The multiple-circuit heating and cooling system of claim 1, wherein the first condenser extends vertically to define a first condenser height, the second condenser extends vertically to define a second condenser height, and the first condenser height is substantially equal to the second condenser height.

7. The multiple-circuit heating and cooling system of claim 1, wherein the first condenser and the second condenser comprise a shared structural element, and wherein the shared structural element comprises a tubesheet or a housing.

8. The multiple-circuit heating and cooling system of claim 1, wherein the first condenser and the second condenser each comprise a plate-fin heat exchanger, wherein the first condenser comprises first fins and the second condenser comprises second fins, and wherein the first fins and the second fins are conductively separated.

9. The multiple-circuit heating and cooling system of claim 1, comprising a third condenser of a third refrigeration circuit, wherein the second condenser is between the first condenser and the third condenser, and wherein the third condenser is entirely upstream of the second condenser relative to the first air flow.

10. The multiple-circuit heating and cooling system of claim 9, comprising a third evaporator of the third refrigeration circuit, wherein the second evaporator is between the first evaporator and the third evaporator, and wherein the third evaporator is entirely downstream of the second evaporator relative to the second air flow.

11. The multiple-circuit heating and cooling system of claim 1, wherein a first temperature lift of the first refrigeration circuit is substantially equal to a second temperature lift of the second refrigeration circuit.

12. The multiple-circuit heating and cooling system of claim 1, comprising a single packaged unit having the first refrigeration circuit and the second refrigeration circuit wherein the first temperature lift comprises a difference between a saturated condensing temperature of the first condenser and a saturated evaporating temperature of the first evaporator.

13. The multiple-circuit heating and cooling system of claim 1, comprising a first compressor configured to circulate a first refrigerant through the first refrigeration circuit and a second compressor configured to circulate a second refrigerant through the second refrigeration circuit wherein the first condenser comprises a first outward-facing surface and a first inward-facing surface, wherein the second condenser comprises a second outward-facing surface and a second inward-facing surface, and wherein the first inward-facing surface faces the second inward-facing surface.

14. The multiple-circuit heating and cooling system of claim 1, wherein the first refrigeration circuit comprises a first expansion device, and the second refrigeration circuit comprises a second expansion device wherein the first inward-facing surface and the second inward-facing surface are in contact with one another.

15. The multiple-circuit heating and cooling system of claim 1, wherein the multiple-circuit heating and cooling system is configured to direct the first air flow along a flow direction that is perpendicular to an outward-facing surface of the second condenser.

16. The multiple-circuit heating and cooling system of claim 1, wherein the multiple-circuit heating and cooling system is configured to direct the second air flow along a flow direction that is perpendicular to an outward-facing surface of the first evaporator.

17. A multiple-circuit heating and cooling system, comprising:
a first condenser coil of a first refrigeration circuit and a second condenser coil of a second refrigeration circuit, wherein the first condenser coil and the second condenser coil are arranged in a first slab, and the first condenser coil is entirely downstream of the second condenser coil relative to a first air flow directed across the first slab; and
a first evaporator coil of the first refrigeration circuit and a second evaporator coil of the second refrigeration circuit, wherein the first evaporator coil and the second evaporator coil are arranged in a second slab, and the second evaporator coil is entirely downstream of the first evaporator coil relative to a second air flow directed across the second slab,
wherein the multiple-circuit heating and cooling system is configured to discharge the second air flow toward a conditioned space to enable cooling of the conditioned space.

18. The multiple-circuit heating and cooling system of claim 17, wherein the first slab comprises a shared structural element, and wherein the shared structural element comprises a tubesheet extending through the first condenser coil and the second condenser coil, a housing extending around the first condenser coil and the second condenser coil, or both.

19. The multiple-circuit heating and cooling system of claim 17, comprising the first refrigeration circuit and the second refrigeration circuit, wherein the first refrigeration circuit and the second refrigeration circuit are fluidly independent from one another.

20. The multiple-circuit heating and cooling system of claim 19, comprising a first compressor configured to circulate a first refrigerant through the first refrigeration circuit and a second compressor configured to circulate a second refrigerant through the second refrigeration circuit, and further comprising a controller communicatively coupled to the first compressor, wherein the controller is configured to activate the first compressor to circulate the first refrigerant through the first condenser coil and the first evaporator coil during part-load operation of the multiple-circuit heating and cooling system.

21. The multiple-circuit heating and cooling system of claim 20, comprising a first expansion device configured to reduce a first pressure of the first refrigerant within the first refrigeration circuit and a second expansion device configured to reduce a second pressure of the second refrigerant within the second refrigeration circuit wherein, during the part-load operation of the multiple-circuit heating and cooling system, the first condenser coil is configured to exchange heat with the first air flow traveling through the first slab such that the first air flow contacts the first condenser coil with substantially no air bypass.

22. The multiple-circuit heating and cooling system of claim 17, comprising a packaged unit having the first refrigeration circuit and the second refrigeration circuit wherein the first condenser coil comprises a first partial coil depth of the first slab, and wherein the second condenser coil comprises a second partial coil depth of the first slab.

23. A multiple-circuit heating and cooling system, comprising:
   a row split condenser, comprising:
      a first condenser coil of a first refrigeration circuit; and
      a second condenser coil of a second refrigeration circuit, wherein the first condenser coil is arranged entirely downstream of the second condenser coil relative to a first air flow directed across the row split condenser to enable the first air flow to pass sequentially through the second condenser coil and the first condenser coil in series; and
   a row split evaporator fluidly coupled to the row split condenser, comprising:
      a first evaporator coil of the first refrigeration circuit; and
      a second evaporator coil of the second refrigeration circuit, wherein the second evaporator coil is arranged entirely downstream of the first evaporator coil relative to a second air flow directed across the row split evaporator to enable the second air flow to pass sequentially through the first evaporator coil and the second evaporator coil in series,
   wherein the multiple-circuit heating and cooling system is configured to discharge the second air flow toward a conditioned space to cool the conditioned space.

24. The multiple-circuit heating and cooling system of claim 23, comprising a controller communicatively coupled to a first compressor of the first refrigeration circuit and a second compressor of the second refrigeration circuit, wherein the controller is configured to instruct the first compressor, the second compressor, or both to respectively actuate a respective refrigerant flow through the first refrigeration circuit, the second refrigeration circuit, or both.

25. The multiple-circuit heating and cooling system of claim 24, comprising a packaged unit having the row split condenser and the row split evaporator wherein, when the first compressor, the second compressor, or both are actuated, the first condenser coil, the second condenser coil, or both are configured to exchange thermal energy with the first air flow traveling through the row split condenser substantially without air bypass.

26. The multiple-circuit heating and cooling system of claim 23, wherein:
   the first refrigeration circuit comprises a first compressor and a first expansion device; and
   the second refrigeration circuit comprises a second compressor and a second expansion device, when the first compressor, the second compressor, or both are actuated, the first evaporator coil, the second evaporator coil, or both are configured to exchange thermal energy with the second air flow traveling through the row split evaporator substantially without air bypass.

* * * * *